123,555

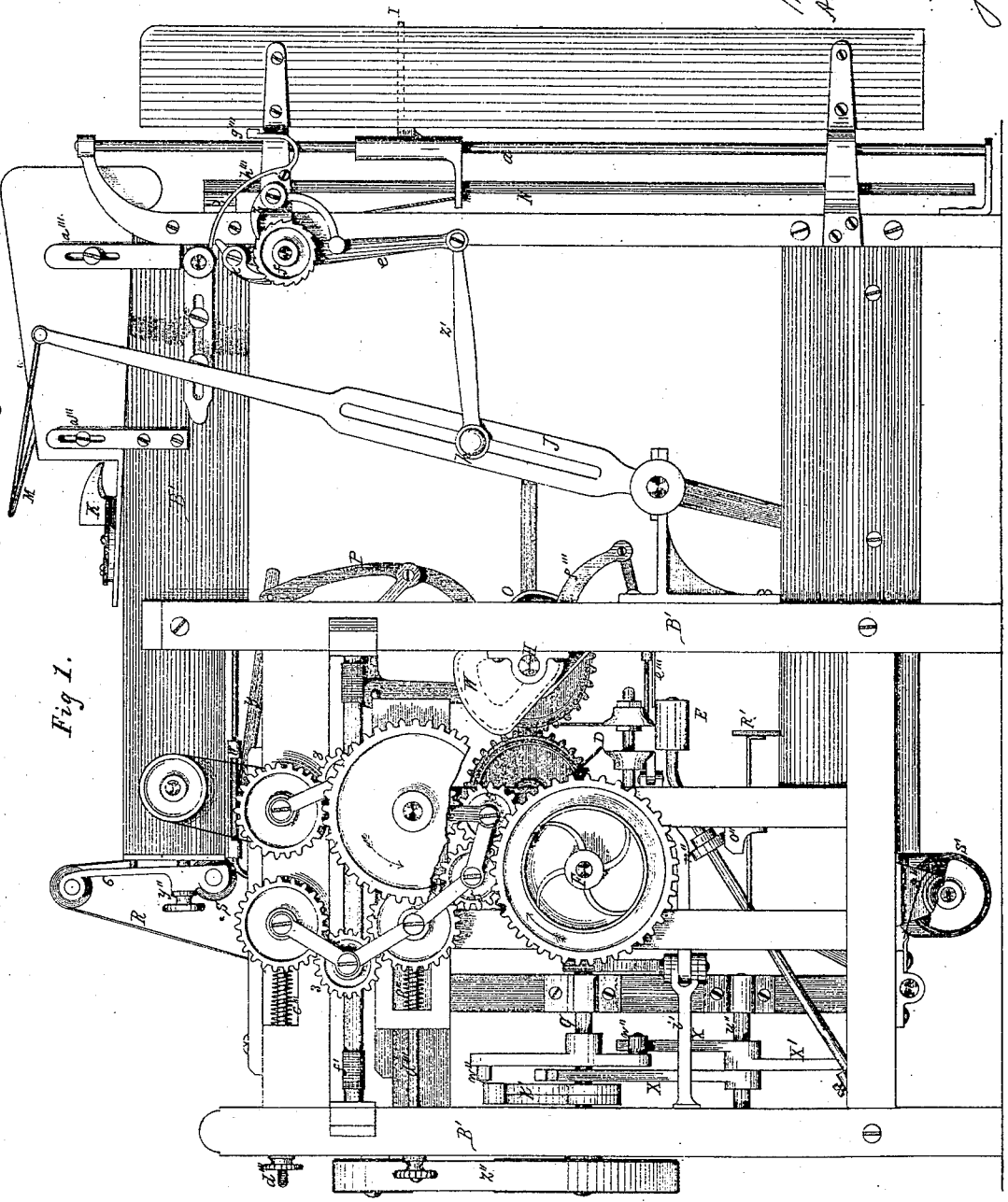

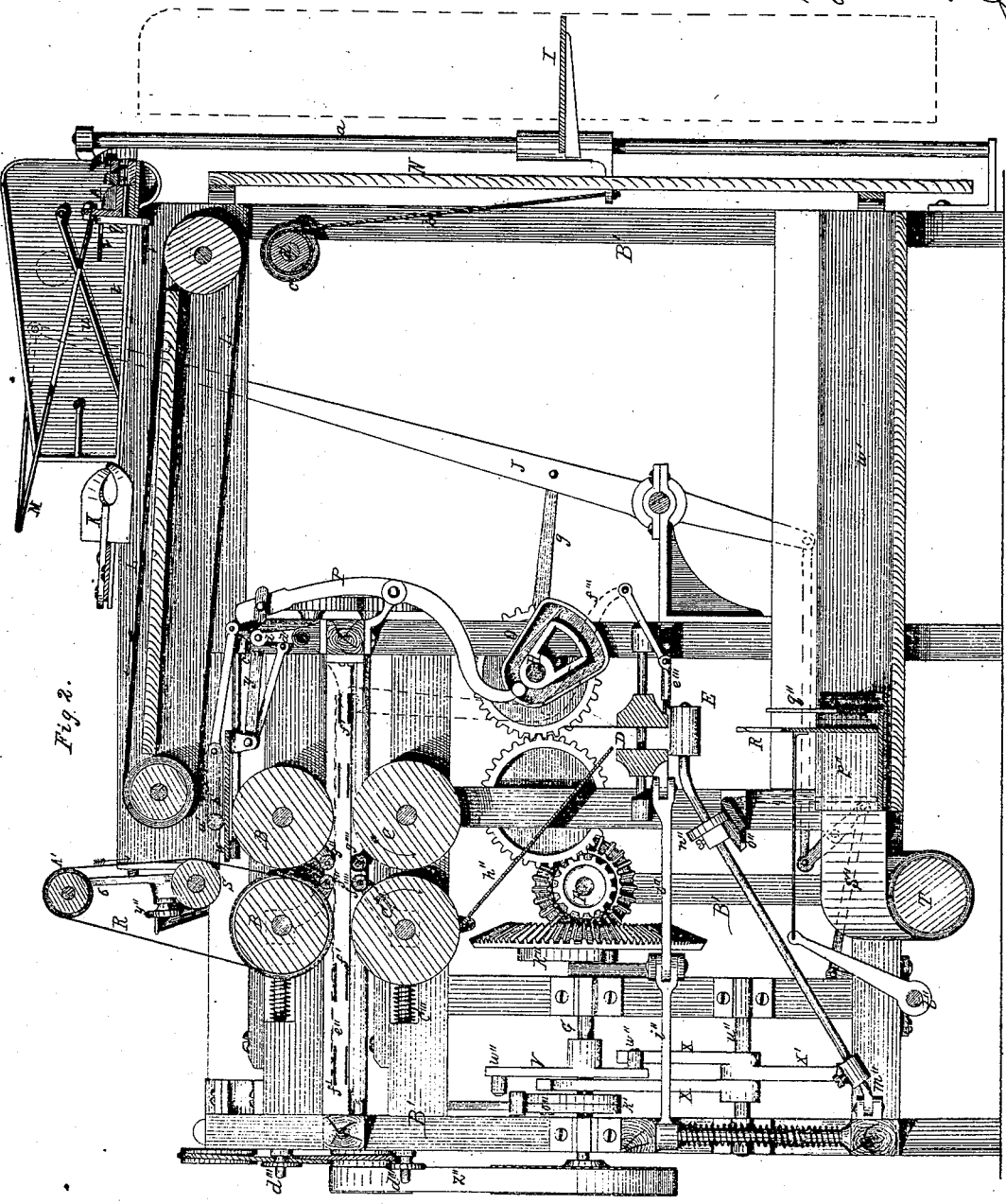

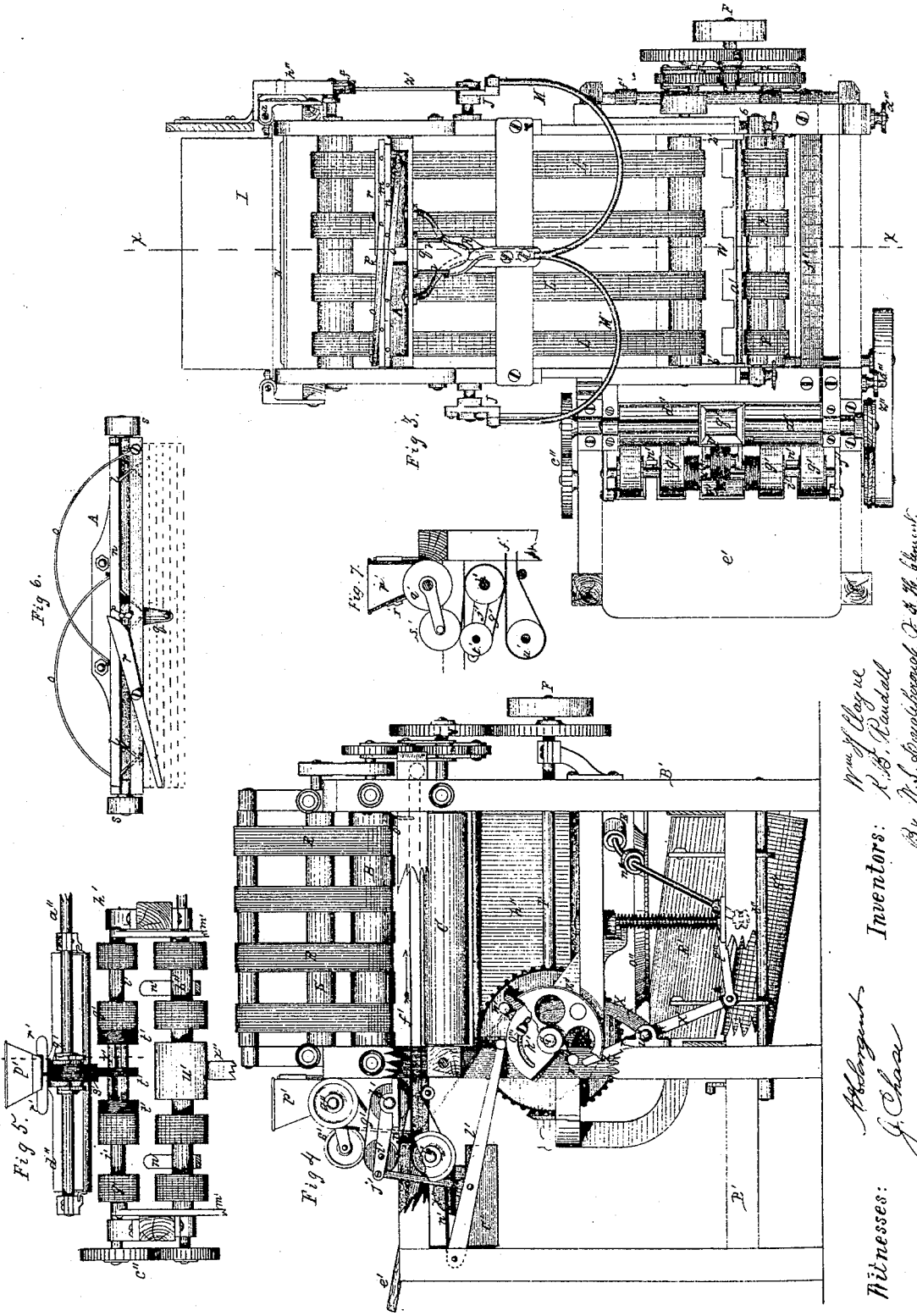

UNITED STATES PATENT OFFICE.

WILLIAM H. CLAGUE AND ROBERT B. RANDALL, OF ROCHESTER, NEW YORK, ASSIGNORS TO THEMSELVES AND EZRA R. ANDREWS, OF SAME PLACE.

IMPROVEMENT IN MACHINES FOR COVERING PAMPHLETS.

Specification forming part of Letters Patent No. 123,555, dated February 13, 1872; antedated January 27, 1872.

SPECIFICATION.

We, WILLIAM H. CLAGUE and ROBERT B. RANDALL, of Rochester, in the county of Monroe and State of New York, have invented a certain "Improved Machine for Covering Pamphlets," of which the following is a specification:

Our invention relates chiefly to the employment of automatic devices for laying the paste upon the covers of pamphlets, for placing and folding said covers in position upon the book, and for pressing and finishing the bound pamphlets; and also in certain mechanical means for operating the parts to effect such purposes.

In the drawing, Figure 1 is a side elevation of our invention. Fig. 2 is a vertical section, showing those parts to the left of the dotted line $x$, Fig. 3. Fig. 3 is a plan view. Fig. 4 is an end elevation, representing the same parts broken away. Fig. 5 is an end elevation of the pasting device. Fig. 6 is a rear view of the pamphlet-feeder. Fig. 7 is a section at the dotted line 6, Fig. 5.

The general operations performed by our machine are feeding in the pamphlets from the "bank" at the rear by means of a reciprocating rake, A, and suitable carrier-belts L; pasting the covers as they are brought into position; causing the pamphlet to meet the cover and fold the same over itself, both to be afterward pressed together by passing through one or more sets of rollers, C, and finished by the press D and backing-roller E, Fig. 2. These parts are operated by the main driving-shaft F, Figs. 1, 2, and 4, which is itself driven by any convenient power, and by the shafts G and H, Figs. 1 and 2, which are connected to the former by spur and bevel wheels, as are also the compression-rollers B and C, as clearly indicated in Fig. 1. The pamphlets are taken by the feeder A from the shelf or platform I, Figs. 2 and 3, moving vertically upon guides $a$, and chains or cords $b$, Fig. 2, are attached to the shelf and coiled over drums $c$ upon a shaft, $d$. This shaft and drum are actuated intermittently by means of the oscillating arm $e$, Fig. 1, carrying pawls $k$, which engage the teeth of the ratchet $f$, and the arm $e$ receives impulse from the rocker-arms J, Figs. 1, 2, and 3, which work the feeder A by means of a connecting-link $z'$, Fig. 1. Thus, after a pamphlet is taken from the bank upon the platform I by the feeder, the rear movement of the latter causes the platform to rise by means of the ratchet $f$ and connected parts, leaving the next pamphlet in position to be caught by said feeder. The stroke of the arm $e$ and pawls is adjusted to pamphlets of different thicknesses by altering the position of pin $h$ in a slot provided in the rocker-arm J. It is desirable to use two or more pawls $k$, their working points varying somewhat in length, whereby the pitch of the ratchet may be quite coarse, even though the pamphlets are so thin as to necessitate a very slight feed upon the platform. The dogs $z$, whose working points correspond in relative length to those of the pawls $k$, catch and retain the ratchet, and consequently the platform, during the interim of the feed. The tripper $h'''$, Fig. 1, is pivoted at a proper point upon the frame of the machine, one extremity extending over the outer arms of the pawls $k$, and the other, $g'''$, arranged to be struck and lifted by the shelf I as it arrives at the upper part of its movement. The pawls are thus thrown out of mesh with the ratchet, and the platform rests till again lowered. The feeder A is reciprocated by the rocker-arms J, to which it is attached by the bent link M, as shown in figs. 1, 2, and 3. Its office is to take the pamphlets singly from the "bank" and de-deposit them upon the carrier-belts L, by which they are conveyed to the binding-rollers, and its construction is fully set forth in the patent of Andrews, Randall, and Clague, dated April 25, 1871, and numbered 114,087. The pamphlets, having been previously stitched, are laid with their backs to the vertical guiding-board N, Figs. 1, 2, and 3, and consequently, as they are carried forward by the belts L, they fall with their backs upon the horizontal stop-plate $w$, Fig. 2, shown withdrawn in Fig. 3. They rest here, momentarily, till the stop is drawn to the rear by the cam O, connecting-lever P, and link $y$, Figs. 1 and 2, which allows them to pass down to the first set of rollers B. To insure this latter action at the proper time, we provide the vertically-moving belts R, Figs. 1, 2, 3, and 4, against which the pamphlets are forced by the friction-roller $a'$. This roller has bearings upon slides $b'$, or similar supporting devices, which are connected by links to the oscillating arm or arms $c'$. These arms are pivoted at the center to a yielding lever or slide, $d'$, and the lower ends are linked to the stop-plate $w$, and consequently partake of its motion imparted by the cam O. Thus it is evident that, when the stop-plate is drawn back, the roller $a'$ moves forward by the reversing action of $c'$, and presses the pamphlet against belts R and guide-roller S, thus carrying it without fail to the rollers below. The axis $d'$ of the arm $c'$ is forced forward by a suitable spring, which is shown as being coiled around the shaft of the rocker-arm $d'$, but which, in case a sliding axis is used, is placed in the rear of it in any convenient manner.

It will be observed that the resilience of the axis of the lever $c'$ will push the roller $a'$ forward against the pamphlet with a force sufficient to insure the passage of the latter downward, while, at the same time, the roller may accommodate itself to pamphlets of different thicknesses by means of such yielding axis. The cover is fed into the machine from the table $e'$, Figs. 3 and 4, and is automatically carried to its position under the entering pamphlet by means of the revolving belts $f'$, Figs. 2, 3, and 4. Shorter belts, $g'$, Figs. 4 and 5, run over pulleys upon a shaft, $h'$, and other pulleys upon a shaft, $i'$, the latter having bearings upon the arms $j'$, which swing from the shaft $h'$, and thus retain the belts $g'$ "taut." The vertical adjustment of the arms $j'$, and of the shaft $i'$ and pulleys, is controlled by a cam, $k'$, Figs. 1, 2, and 4, secured to the shaft G, the movement being communicated through a swinging lever, $l'$, and link $m'$, Fig. 4. Stops $n'$, Figs. 3, 4, and 5, are connected to the rock-shaft, to which is attached the lever $l'$, and partake of its movement, their bent ends projecting somewhat above the surface of the belts $f'$, and forming a gauge, against which the edge of the cover is placed when fed in by the operator. It will be seen that, when the lever $l'$ falls from the verge of the cam, the belt-shaft $i'$ and pulleys drop upon the cover, and the stops $n'$ simultaneously descend, allowing the cover to be drawn in upon the belts $f'$ to a point where it meets the gauge $o'$, Fig. 4, directly under the feed-rollers B. The paste or cement to be applied to the cover is contained in a reservoir, $p'$, Figs. 3, 4, and 5, which is fitted closely over a smooth-faced roller, $q'$. The paste is thus prevented from flowing out of the reservoir, except at an opening between the gates $r'$, Fig. 5, which are adjustable to and from each other at the will of the attendant. A grooved roller, $s'$, which has a width of face equal to the widest surface designed to be pasted, bears against the periphery of the fountain-roller $q'$, and, receiving therefrom the cement or paste, conveys it to the distributing-roller $t'$ upon the shaft $i'$, which roller is also provided with shallow circumferential grooves, as shown. The intermediate $s'$ swings upon arms from the shaft $a''$ concentrically with the fountain-roller, and its periphery remains in contact with the latter, while its gravity causes it to rest upon the periphery of the distributer also at any vertical position of the shaft and pulleys $i'$. As the shaft $i'$ descends by the action of the cam $k'$ and lever $l'$, and the belts $g'$ come in contact with the cover, the distributer $t'$, the diameter of which corresponds to the diameter of the belt-pulleys and the thickness of the belts, also touches the cover and begins to lay the paste, the cover being supported from below by the smooth roller $w'$, Fig. 5, upon the lower shaft $b''$. The fountain-roller and shaft $a''$ are driven from $b''$ by a belt, and the shaft $h'$ is also actuated from $b''$ by gears $c''$, Figs. 3 and 5, while $b''$ itself is shown as driven by a belt, $z''$, from a pulley upon the shaft G. Other means of operating these parts may, however, be adopted, as may be deemed desirable.

In practice, we find that the moisture in the paste is absorbed by the cover before it reaches the binding-rollers. To prevent the paste from becoming too dry, we dampen the lower side of the cover by means of the roller $x''$, Fig. 4, which revolves in water contained in the basin $C'$. The periphery of the roller $x''$ touches the supporting-roller $w'$, and conveys to it a small quantity of water, which in turn is carried to the back of the cover, thus preventing absorption from the paste. It may be desirable to cover the roller $w'$ with felt or cloth, which, by the above means, is kept saturated. It is often necessary to vary the width of the layer of paste upon the cover for pamphlets of different thicknesses; and for this purpose the distributer $t'$ is made in several sections, as indicated in Fig. 5, which slide along the shaft $i'$, those not in use being retained against the belt-pulleys at each side out of contact with the intermediate $s'$. Detachable collars $x'$, or other similar devices, fit between the sections and retain them in the position in which they are placed. Thus any number of the sections may be pushed under the intermediate and become part of the distributer. A trough, $d''$, catches the paste which overflows from the reservoir $p'$.

The cam $k'$ is made up of two plates, as indicated in Fig. 2, one of which is keyed to the shaft G, and the other made adjustable thereon circumferentially by means of a bending screw, $o'''$, Fig. 4. By this construction, since the main working-edge of the cam is concentric with the shaft, the length of such edge, and consequently the duration of the elevation of the belts $g'$, can be increased or diminished, as desired, and the pasting and feeding devices thus adjusted to work covers of varying length. As the pamphlet passes between and is forced along by the rollers B, it meets the cover lying upon the belts $f'$, as shown in dotted lines $e''$, Fig. 2, with the pasted side uppermost, which is thus, by the advance of the pamphlet, folded over the latter, and both are pushed between and grasped by the compression-rollers C. These rollers complete the folding of the cover, and press the two firmly together. One of each of the sets of rollers B and C has a lateral movement, together with its bearings, to accommodate pamphlets of different thicknesses, and they are forced toward the stationary rollers by suitable springs $c'''$, Figs. 1 and 2. The reactionary movement of these springs is limited, however, by adjusting-screws $d'''$, which are attached at one end to the roller-boxes, and controlled by nuts at the other. Thus the rollers are free to move and compress the springs sufficiently to allow the pamphlet to pass, while their general position is adjusted by the screws $d'''$; whereby, when properly adjusted, they offer no more obstruction to the entrance between them of a thick than a thin pamphlet. The rollers B C are driven from the shaft F by trains of gears, the intermediates 3, 5, and 8 being linked to the roller-shafts, as shown in Fig. 1, and thus always retained in uniform mesh. Between the sets B and C of rollers we introduce two sets of independent guiding-rollers, $f'' g'' f'''' g''''$, of which the bearings of $f''$ and $f''''$ are attached to the movable boxes of the large rollers, as indicated in dotted lines, Fig. 2, and consequently partaking of their motion and adjustment. The upper set $f'' g''$ of these small rollers guides the descending pamphlet so that it meets the cover squarely, and is not liable to double over; the lower set $f'''' g''''$ assists in this function, and also acts to draw the cover tightly over the back of the book. Thus it will be seen that the large rollers C, which are driven by suitable gearing, act as compressing and delivering devices for the covered pamphlet, while the auxiliaries $f'''' g''''$, driven only by the friction of the cover consequent upon the advance of the pamphlet, fold and smooth the cover over the back of the latter preparatory to its being finished by the compressers C and press and backer D and E. When, however, the pamphlets are quite thick, and stiff enough to guide themselves, these sets of small rollers may be dispensed with, although we find them quite essential for the purposes above mentioned, as, unless some similar device is provided, there would be an uncertainty about the position in which the pamphlet would join the cover, and the latter might be slack or wrinkled after issuing from the rollers C. The chute $h''$ conducts the bound books to the finishing-press D, the sliding jaw of which is actuated by the cam $k''$ on the shaft G and knee-levers $i''$. When desired, the finishing-press D may be arranged immediately beneath and in close proximity to the rollers C, and the chute $h''$ dispensed with. A sliding stop, $e'''$, Figs. 1 and 2, is moved under the press by means of the cam W, Fig. 1, and pivoted lever $f''''$, the latter shown in dotted lines in Fig. 2. The pamphlet rests upon this till the press closes. After the press has grasped the book and the slide $e'''$ is withdrawn, the backing-roller E, preferably constructed of a yielding material, and oscillating upon a center, $m''$, sweeps around and squares up the back, (which otherwise would be somewhat rounded, owing to the drawing action of the rollers,) pressing the cover into close contact with the pamphlet at that point, while the press D performs the same function at the sides. The movement of the backing-roller E is controlled by the revolving tappets $w''$, which alternately come in contact with each of the branches of the lever X secured to the rock-shaft $u''$. The lever-arm X' of the rock-shaft is connected to the spindle of the roller E by a link, $p'''$, Fig. 4, provided with a universal joint, 2. It will be seen that, just as one tappet leaves the shorter branch of X, moving the backing-roller in one direction, the other tappet comes in contact with the larger branch, and returns said roller, thus completing a double movement of the roller over the book; and the tappet-arms V are so proportioned with relation to the lever X that such movement is intermittent, taking place exactly at the time above mentioned. The curved inclined track $o''$, Figs. 1, 2, and 4, supports the roller E by means of the carrier-wheel $n''$ on its spindle. It may be preferable, however, to make the spindle of E horizontal, and the track $o''$ to correspond, thus rendering the construction of the parts less expensive. The follower R', shown in its extreme forward position in dotted lines in Fig. 2, moves upon a fixed platform, $p''$, and as the pamphlet falls from the press upon the latter the follower is pushed to the rear, pressing the pamphlet against the rest $q''$, which is attached to an extensible apron, S'. As the book passes the edge of $p''$, it drops upon the apron S', and as each succeeding pamphlet is forced backward the apron receives it, as above described. The apron is wound upon a drum, T, the revolution of which is opposed by a spiral or other suitable spring, $s''$, Fig. 1. Thus the rest $q''$ retains the pamphlets in a regular position till dry, or till removed by an attendant. The follower R' is worked by the rock-shaft $t''$ through suitable connecting-links and arms from the rocker-arms J, as indicated in full and dotted lines in Fig. 2. The apron S', as it advances, is supported upon the platform $w'$ secured to the frame of the machine. The vertical belts R pass over a sustaining-roller, A', Fig. 2, a guide-roller, S, and run in grooves in the forward feed-roller B. The rollers S and A' have bearings in adjustable frames or bars 6, which are controlled by set-screws $y''$, whereby the position of the belts R with relation to the slide $w$ and roller $a'$ may be regulated for pamphlets of different thicknesses.

In the construction and operation of our machine, the movement of the feeder A and speed of the belts L and R are such that a pamphlet is conveyed forward to the stop $w$ just before the latter is withdrawn by the cam O; the cam $k'$, Fig. 4, is so adjusted that the belts $f' g'$ carry the pasted cover under the rollers B and against the stop $o'$ somewhat previous to the descent of the pamphlet; the movements of the stop-plate $e'''$, press D, and backing-roller E follow each other consecutively; and the actuating-cams W and $k''$, tappets $w''$, and levers X are properly constructed and adjusted for this purpose, All the parts of our machine are attached to and supported by a suitable frame-work, B', constructed of wood or iron, as may be deemed desirable.

What we claim as our invention is—

1. A machine for covering pamphlets, embracing in its construction the following instrumentalities, viz., the pamphlet-feeding devices A L R, or their equivalent, with or without the stop $w$ and roller $a'$, the rollers B for forcing the pamphlet against the cover, and the rollers C for uniting cover and pamphlet, with or without the intermediate or auxiliary rollers $f'''$ $g'''$ and $f''''$ $g''''$, arranged to operate conjointly for the purposes set forth.

2. A pamphlet-covering machine, embracing in its construction the following instrumentalities, viz., a pamphlet-feeder, the rollers B for forcing the pamphlet against the cover, the intermittently-acting cover-feeding devices $f'$ $g'$, or their equivalent, and the rollers C for uniting the cover and pamphlet, arranged to operate conjointly for the purposes set forth.

3. A pamphlet-covering machine, embracing in its construction the following instrumentalities, viz., a pamphlet-feeder, the rollers B for forcing the pamphlet against the cover, a cover-feeder, the paster $t'$, and rollers C for uniting cover and pamphlet, arranged to operate conjointly for the purposes set forth.

4. The combination, in a pamphlet-covering machine, of the rollers C, the finishing-press D, and backing-rollers E, arranged to operate conjointly substantially in the manner set forth.

5. A pamphlet-covering machine, embracing in its construction the following instrumentalities, viz., a pamphlet-feeder, a cover-feeder, and a cover-paster, the rollers B for forcing the pamphlet against the cover, and rollers C for uniting cover and pamphlet, and the finishing press D and backing-roller E, operating conjointly for the purposes set forth.

6. The pamphlet-feeding rollers B and folding and compressing rollers C, in combination with a device for feeding the covers horizontally between the two sets of rollers, whereby the pamphlet is forced against the cover, and the latter folded over the back of the former, substantially in the manner set forth.

7. The combination of the receding stop $w$ and advancing roller $a'$, acting conjointly and automatically with the carrier-belts L R, whereby the pamphlet is fed to the machine at a proper time to meet the cover, substantially as herein set forth.

8. The rollers B and C, arranged to operate as described, when driven by linked gears 3, 5, and 8, and one roller of each pair is provided with yielding bearings controlled in one direction by springs $c'''$, and their movement limited and adjusted in the opposite direction by screws $d'''$, for the purposes set forth.

9. In combination with the friction-roller $a'$ and stop $w$, the connecting-arm $c'$, pivoted upon a resilient axis, $d'$, whereby the roller is allowed a limited movement independently of the stop, while actuated conjointly therewith by means of a cam, O, and lever P, substantially as described.

10. The paste-roller $q'$ and paste-reservoir, in combination with the concentrically-swinging intermediate $s'$ and the paste-roller $t$, hung in the arms $j'$ pivoted upon the axis $h'$, all arranged and operating substantially as and for the purposes set forth.

11. The combination of the revolving tappet $w''$ and the oscillating levers X X', having a common fulcrum, $u''$, for the purpose of producing a positive reciprocating intermittent movement of the backing-roller, substantially as described.

12. The receiving-apron S', the longitudinal movement of which is controlled by a spring, and which is provided with a rest, $q''$, in combination with the reciprocating follower R', operating conjointly substantially as described.

W. H. CLAGUE.
R. B. RANDALL.

Witnesses:
F. H. CLEMENT,
DE L. CRITTENDEN.